INVENTOR
JAMES R. JONES

United States Patent Office 3,373,072
Patented Mar. 12, 1968

3,373,072
CHEMICAL EMBOSSING METHOD
AND PRODUCT
James R. Jones, Lancaster, Pa., assignor to Armstrong Cork Company, Lancaster, Pa., a corporation of Pennsylvania
Filed Dec. 16, 1965, Ser. No. 514,353
7 Claims. (Cl. 161—116)

This invention relates generally to a decorative surface covering, and more particularly to a decorative surface covering having in part a cellular or foamed structure. Still more particularly, the invention relates to a thermoplastic decorative surface covering having an embossed appearance achieved by chemical action without the use of mechanical embossing.

The mechanical embossing of foamed or cellular sheets, in combination with printing, has always presented several problems. It has been difficult to achieve sharp edges and sharp lines of demarcation in the embossed areas when dealing with foamed structures. Where printing is carried out in addition to the embossing, the problem of attaining register between the embossing rolls and the printing rolls has been exceedingly difficult. The difficulty increases with the width of the embossed and printed sheet. Therefore there has been a need for an improved method of imparting an embossed appearance to the thermoplastic sheet.

It is the primary object of the present invention to supply such a need. It is still another object of the present invention to supply a chemical method of imparting an embossed appearance to a cellular sheet. It is still another object of the present invention to describe a method wherein embossing and printing on a decorative sheet coincide perfectly.

These objects are accomplished in a straightforward and effective manner. The invention contemplates blending a vinyl resin, a plasticizer for the vinyl resin, a blowing agent which decomposes when heated at a temperature in the range above the glass transition temperature of the plasticized vinyl resin and below the decomposition temperature of said resin, and an accelerator for the blowing agent. The above-described mixture is formed into a sheet. There is then applied to the resulting sheet in a predetermined pattern a composition in liquid form containing a tin salt. Finally, the resulting sheet is heated to a temperature in the range of 300–450° F. to fuse the plasticized resin and decompose the blowing agent in the areas which have not been subjected to treatment with the tin salt.

Figure 1:
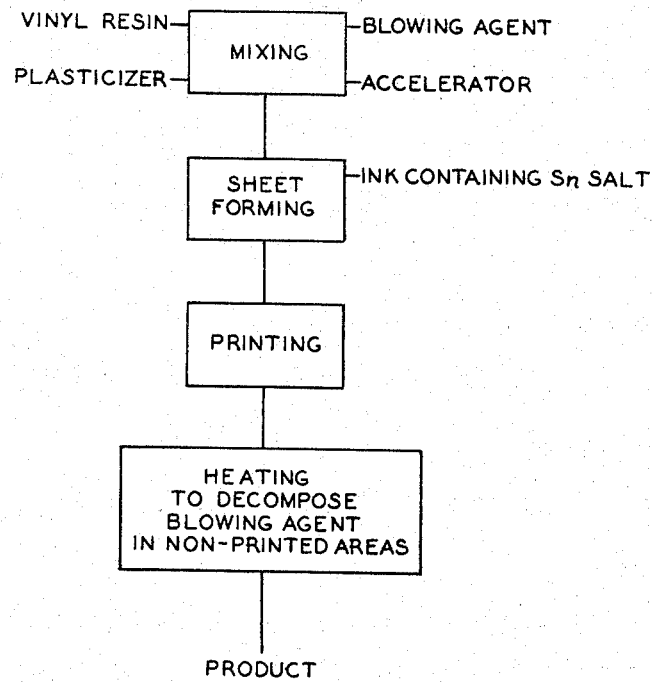
Figure 2:
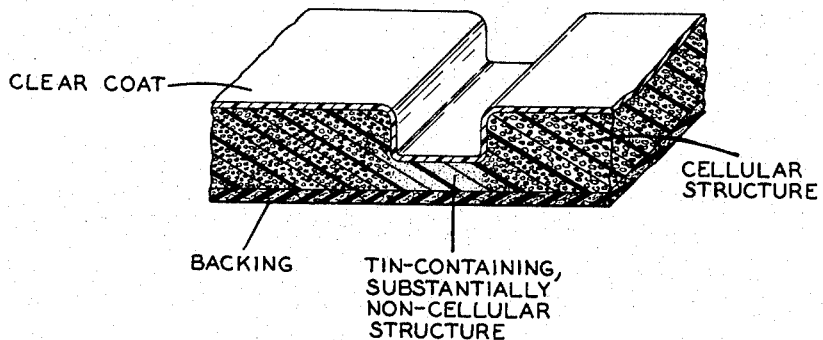

Referring to the drawings, which are self-explanatory,
FIG. 1 illustrates a flow diagram showing the method of the present invention, and
FIG. 2 illustrates an enlarged cross section of a product of the present invention having a backing and a top clear coat.

The thermoplastic resins useful in the present invention are those resins capable of forming films and sheets. Such resins will primarily comprise the polymers and copolymers of vinyl chloride. Poly(vinyl chloride) itself is the preferred resin, although copolymers of vinyl chloride with vinyl acetate, vinylidene chloride, other vinyl esters such as vinyl proprionate, vinyl butyrate, as well as alkyl substituted vinyl esters may be used. Vinyl chloride may also be copolymerized with any of a number of acrylic compounds such as acrylic acid and the esters thereof and the corresponding methacrylates. The thermoplastic resins are those formed by addition polymerization as opposed to the normally non-thermoplastic resins formed by condensation. The glass transition temperature of these thermoplastic resins is the temperature at which the resin changes from a hard, brittle solid to a flexible solid. Increasing plasticization of the resin increasingly lowers the glass transition temperature. As a practical matter, the glass transition temperature of the resin lies close to the initial gellation temperature of the resin dispersed in a plasticizer even though the initial gellation temperature is rate sensitive.

The thermoplastic resin, preferably poly(vinyl chloride) as described above, will be combined with a plasticizer for the resin in order that the resin may be formed into a sheet. A convenient method for making the sheet is to utilize a dispersion grade poly(vinyl chloride) resin and blend the resin with 20–130 parts by weight plasticizer per 100 parts by weight of the resin. The formation of a plastisol is a convenient means for forming a sheet from the thermoplastic resin. A plastisol is a mixture of a thermoplastic resin and a plasticizer therefor, the resin normally being distributed in the plasticizer in a kind of slurry. Suitable plasticizers are the ester type plasticizers such as dioctyl phthalate, dioctyl sebacate, dioctyl adipate, dioctyl azelate, in which the octyl group is frequently in the form of a 2-ethyl hexyl group. Other alkyl groups can be used in place of the octyl group to yield, for example, plasticizer such as dibutyl phthalate, dibutyl sebacate, dibutyl adipate, and the like. The phosphate esters are also useful, for example tricresyl phosphate. The viscosity of the plastisol will be controlled to some extent by selection of the particular plasticizer, the particular resin, and the amounts of each to be used. Hence a range of viscosities is available depending on how a sheet is to be formed from the plastisol.

Instead of a plastisol, the resin may be utilized in the form of an organosol. In this sense, an organosol means a vinyl resin and plasticizer as described earlier, plus an organic solvent for the vinyl resin at elevated temperatures. Such solvents may be ketones, aliphatic hydrocarbons, aromatic hydrocarbons, and various mixtures of these such as is found in various hydrocarbon fractions sold on the market as solvents for vinyl resins. The amount of solvent to be used in the organosol may vary from 10 to 25 parts by weight organosol per 100 parts by weight of the resin. The function of the organic solvent is to aid in the handling of the resin slurry in the formation of a sheet. Use of plastisols over organosols is preferred in the present invention in order to minimize any problems of solvent removal.

The blowing agent to be used in the present invention must be thoroughly distributed throughout the resin-plasticizer mixture. A variety of blowing agents is available on the market for incorporation in the thermoplastic resin. The preferred blowing agent for poly(vinyl chloride) is azodicarbonamide which normally decomposes at a temperature of about 390° F. in air. This blowing agent is particularly suitable for use in the method of the present invention in view of its relatively high decomposition temperature. Furthermore, this decomposition temperature is readily controlled by the addition of accelerators, to be described below. The following table shows other usable blowing agents with the temperature at which they release gas vigorously in dioctyl phthalate:

Blowing agent: Temperature, ° F.
Azobisisobutyronitrile _____ 240
N,N'-dimethyl-N,N'-dinitrosoterephthalamide _____ 220
p,p'-Oxybis (benzenesulfonylhydrazide) _____ 320
p,p'-Oxybis (benzenesulfonylsemicarbazide) _____ 425
Barium azodicarboxylate _____ above 480
Dinitrosopentamethylenetetramine (80%) _____ 370

The usable blowing agents will generally comprise the substituted hydrazides, substituted azo compounds, and substituted nitroso compounds. The blowing agent will normally be present in an amount in the range of about 0.5%–15% by weight based on the weight of the thermoplastic resin. As a general rule, the preferred minimum decomposition temperature of the blowing agent should be about 250° F. in the composition of the present invention, and the blowing agent should decompose below the decomposition temperature of the resin, which in the case of poly(vinyl chloride) would be about 400° F. However, stabilized vinyl resin compositions will normally not decompose until even higher temperatures— approaching 450° F.—are reached. Additionally, it will be recognized that the heating of such compositions is also a rate controlled process in that the composition may be exposed to relatively high temperature, for example 600° F., for sufficiently short periods of time that the resin itself does not rise above its decomposition temperature. The blowing agents will be used in an amount of about 1–15 parts by weight per 100 parts by weight of the resin. Where azodicarbonamide is used, the blowing agent of choice, the range will generally be about 2–6 parts by weight azodicarbonamide per 100 parts by weight of the vinyl resin.

The fourth ingredient of this composition will be an accelerator for reducing the decomposition temperature of the blowing agent. These accelerators are known items of commerce and may be purchased as such. Preferably in the present invention, the accelerator will comprise an organic lead salt or an organic zinc salt, or a mixture of the two. A lead or zinc octoate in the form of a lead or zinc 2-ethyl hexanoate is preferred, although either of the lead or zinc compounds may be in the form of a phosphite or other metallic salt. It is the metallic portion of the molecule that is important in achieving the acceleration effect. These accelerators reduce the decomposition temperature of the blowing agent in the vinyl chloride resin system by as much as 50° F. To be operable in the present invention, the accelerators used should reduce the decomposition temperature of the chosen blowing agent by at least about 20° F.

The accelerator will frequently be used in approximately the same amount as the blowing agent. This amount, however, may be varied as needed in order to insure that a change of decomposition temperature of at least about 20° F. is achieved in the vinyl composition. Based on the metal content of the accelerator salts, the amount of lead or zinc to be present will be in the range of 1% to 5% by weight based on the weight of the total composition.

To these four critical ingredients, the resin, the plasticizer, the blowing agent, and the accelerator, there may be added additional ingredients such as pigments, dyes, or other decorative elements to the composition to be formed into the sheet. Depending on the material used and the intensity of the color desired, the amounts of such extra additives will normally range from a small fraction of one percent to 20% by weight of the total composition. Relatively small amounts of a granular filler such as a clay, limestone, or silicate may be used. However, the composition cannot be highly filled in view of a need for at least a portion of the composition to expand and form a cellular or foamed region. Fillers to be used, if any, will normally be present in less than about 20% by weight of the total composition. Small amounts of heat and light stabilizers will also be incorporated. These are known in the art and may comprise the barium-cadmium salts of long-chain fatty acids, polyols such as pentaerythritol or alpha-methyglucoside, nitrogen compounds such as melamine or dicyandiamide, esters such as phenyl phthalate, phenyl benzoate, o-toluol benzoate, triethylene glycol salicylates, certain of the organic phosphates, and mixtures thereof. Such stabilizers will not normally be present in amounts greater than about 3% by weight of the total composition.

The several ingredients will be blended to achieve thorough distribution of one in the other in customary manner well known in the art. After thorough mixing has been achieved, the plastisol or organosol is formed into a sheet.

The plastisol may be doctored, roll coated, or otherwise applied to a backing or to a strippable carrier which may be a steel belt, a rubber belt, paper, or a felt having a release coating thereon. An organosol may be handled the same way. Application of relatively gentle heat to the plastisol or organosol causes a low degree of fusion and thus gels and slightly sets the sheet so it may be removed or otherwise handled for further treatment. The amount of heat applied at this stage of the process is insufficient to decompose the blowing agent, even in the presence of the accelerator. The plastisol or organosol will often be applied directly onto a backing which is to became a permanent part of the surface covering. The backing will be one suitable for use as a surface covering, for example, a felt, preferably a rubber-bonded asbestos backing, a vinyl sheet backing, a cellulosic felt or other backing which lends itself to surface covering applications.

The process so far has produced a thermoplastic sheet which will normally have at this stage of the process a thickness in the range of about 0.01 to 0.15 inch, exclusive of any backing. The sheet will contain thoroughly distributed therein a blowing agent in condition to liberate gas when sufficient heat has been applied to the sheet to reach the decomposition temperature of the blowing agent as influenced by the accelerator.

The crux of the present invention lies in applying in a predetermined pattern to the above-described sheet a deactivator compound which destroys the temperature-reducing effect of the accelerator which is part of the sheet. When this deactivator, carried in an ink or other liquid, comes into contact with the accelerator, it destroys the effectiveness of the accelerator. Hence those areas to which the deactivator is applied will form a foam only at an appreciably higher temperature than those areas to which the deactivator has not been applied. When heat is subsequently applied to the printed sheet, the sheet will achieve a temperature sufficient to decompose the blowing agent in those regions where the accelerator is still present, but not sufficient to decompose the blowing agent in those areas which have been treated by the deactivator.

In order that the deactivator achieve penetration into the sheet, it should preferably be mixed with a liquid that will penetrate the sheet and thus carry the deactivator into the sheet where it will be available to and in contact with the accelerator. This carrier liquid with which the deactivator is blended is preferably a diluent, solvent, or plasticizer for the vinyl resin in the plastic sheet. For example, a mixture of methyl ethyl ketone and dioxane serves as an excellent carrier for these compounds. Any one of several ketones may be used alone or in mixtures, for example ethyl amyl ketone, methyl ethyl ketone, methyl isobutyl ketone, cyclohexanone, and mixtures thereof. The deactivator compounds, to be described below, are normally soluble or at least partly soluble in the liquid which is to be printed or otherwise applied to the slightly gelled plastisol sheet in order that maximum contact be established between the compound and the accelerator distributed throughout the plastic sheet. The solution of carrier liquid and deactivator is applied in a predetermined pattern to the partly gelled thermoplastic sheet described above. Penetration of the liquid into the sheet brings the deactivator into contact with the accelerator. Sufficient heat is then applied to the treated or printed sheet to raise the temperature of the sheet above the temperature at which the blowing agent plus accelerator will release gas but below the temperature at which the blowing agent and deactivated accelerator will release gas.

Application of the carrier liquid containing the deactivator may be carried out in any convenient manner. The carrier liquid may in fact be used as a printing ink and may also contain binder, dyes, pigments, filler, wetting agent, stabilizer, and other compounds normally found in an ink. Such a colored ink, when printed on an above-described thermoplastic sheet by any of the known printing methods, will produce a colored design or pattern printed on the sheet. Subsequent application of heat as described earlier will then produce foaming in only those areas which have not been contacted with this ink. The deactivation of the blowing agent-accelerator system in those areas where the deactivator-containing ink has been applied will inhibit foaming.

As mentioned above, the areas printed with the deactivator-containing ink will be unfoamed to the desired extent, while the remaining areas containing the blowing agent-accelerator system will be foamed. Use of larger or smaller amounts of deactivator serve to control the extent of foaming allowed in the printed areas, thus achieving multi-level embossing if desired. It is also possible to separately print those areas which will be foamed with ink which does not contain the deactivator, although problems raised by registration requirements will become important. These inks, both deactivator-containing and without the deactivator, will be printed in the thicknesses normally used in laying down a pigmented or dye-containing ink film. They generally will range in thickness from about 0.1 mil to about 20 mils, depending on the ability of the liquid carrier to penetrate the thermoplastic sheet and on the concentration of the deactivator in the liquid carrier. Depending on the activity of the particular deactivator selected, the concentration of the deactivator in the ink will generally run in the range of about 5%–65% by weight of the total weight of the ink.

The deactivator for use in the present invention is a tin salt. The tin may be divalent or tetravalent, and the salt may be organic or inorganic. Mixtures may be used. If organic compounds are used, it is preferred that the organic moiety not be extraordinarily large since this will require a greater concentration of the tin salt in the printing ink or carrier liquid. A convenient organic tin salt is tin formate, although tin malleate and tin mercaptides have also proved useful. Tin salts of organic fatty acids containing 1–18 carbon atoms may be used. Of the inorganic tin salts, the tin chlorides, both divalent and tetravalent, and containing varying amounts of water of crystallization have also been useful. The tin nitrates, sulfates, and carbonates are also useful, as are mixed organic-inorganic combinations. The printing ink is readily formed by simply adding the tin salt to the ink during the usual processes of ink formation. If a mere carrier liquid such as a ketone is to be used alone in order that no color or dyes be left in the printed areas, then the carrier liquid and tin salt may simply be mixed to form the deactivating liquid to be applied in any desired pattern. Depending on how such liquid is to be applied, the rate of volatilization of the carrier liquid may be controlled by the addition of liquids having different boiling points. For example, cyclohexanone may be added to a solution of the tin salt in methyl ethyl ketone in order that the carrier liquid will volatilize more slowly. In similar manner, the drying rate of a printing ink may be controlled by utilizing different ketones having different boiling points.

Where the usrface covering prepared by the present process is to be used as a floor covering, an additional wearing surface may be applied over the entire system prior to the final heating step which will bring about the foaming of the unprinted portions of the sheet. Once the composition containing the deactivator has been applied in a decorative pattern on the surface of the thermoplastic sheet, the sheet may be dried without causing foaming by the application of gentle heat. A clear or colored coating of a thermoplastic resin may then be sprayed, doctored, or roll-applied over the entire sheet in known manner. This final coating may contain a flatting agent to control gloss. Such coating may consist of a plastisol or organosol; it will normally contain little or no pigment or filler therein. This clear coat will be the final coat and will overlay any printing which has previously been applied to the thermoplastic sheet. On application of heat to cause fusion of the resin and decomposition of the blowing agent-accelerator system, the clear coat will also fuse and become an integral part of the system covering both the raised foam areas and the low unfoamed areas on the sheet.

All parts and percentages in the following example are by weight.

*Example*

A plastisol was prepared having the following formulation:

| Ingredients: | Parts by weight |
|---|---|
| Poly(vinyl chloride) | 100 |
| Dioctyl phthalate | 49.7 |
| Epoxidized soya bean oil | 5 |
| Zinc (2-ethylhexanoate), 9.6% zinc | 4 |
| Azodicarbonamide, 60% solids in dioctyl phthalate | 4.2 |
| Titanium dioxide, 58% solids in dioctyl phthalate | 8.6 |

After thorough blending, the plastisol was spread in a film 12 mils thick on a beater-saturated asbestos felt sheet normally used for floor covering backings. The plastisol was converted to an incipient gel by subjecting it to a temperature of 250° F. for 4 minutes. No decomposition of the blowing agent occurred. On cooling, the gelled plastisol film on the backing was in condition to be printed with a printing ink.

A series of six ink compositions was prepared having the following formulations:

| Ingredients | Parts by Weight | | | | | |
|---|---|---|---|---|---|---|
|  | 1 | 2 | 3 | 4 | 5 | 6 |
| Vinyl chloride-vinyl acetate copolymer, 14% by weight vinyl acetate, pigmented | 5 | 5 | 5 | 5 | 5 | 5 |
| Methyl ethyl ketone | 5 | 15 | 25 | 25 | 25 | 25 |
| Tin mercaptide (Thermolite 31) | 40 | | | | | |
| $SnCl_2 \cdot 2H_2O$ | | 20 | | | | |
| $Sn(COO)_2$ | | | 20 | | | |
| $SnCl_2$ | | | | 20 | | |
| $SnCl_4 \cdot 5H_2O$ | | | | | | 20 |

Patterns were printed on the gelled plastisol sheet using each of these inks. The drying rate of the various inks was readily controlled by replacing the methyl ethyl ketone in part or in toto with varying amounts of other ketones such as methyl isobutyl ketone, ethyl amyl ketone, and cyclohexanone. The printed design used was that of a beach pebble pattern. The wet film of printed ink was about 0.1 mil thick. The ink was dried in air.

The printed gelled plastisol sheet was then coated with a clear coat organosol to supply the actual wear layer in the finished product. A variety of poly(vinyl chloride) resins was used in the formulation of various clear coats. The following formulation was preferred:

| Ingredients: | Parts by weight |
|---|---|
| Poly(vinyl chloride) | 100 |
| Dioctyl phthalate | 20 |
| Epoxidized soya bean oil | 5 |
| Barium, calcium, lead phosphite stabilizer | 3 |
| Polyethylene glycol, molecular weight about 200 | 2 |
| Hydrocarbon solvent, primarily aliphatic | 12 |

The clear coat was applied by Bird blade to the printed gelled plastisol sheet. The clear coat was dried by gelling it at 250° F. for 2 minutes.

The entire system was then fused and foamed by subjecting the coated printed gelled plastisol sheet on a backing to a temperature of 370° F. for 3.5 minutes. The resulting product was then cooled and examined in each case.

The amount of restriction was measured on these and on other samples. To determine the amount of restriction, the specimen was sliced and the cross section was examined. The fully blown areas which had not been exposed to the printing ink were taken to represent on the average the maximum height of the cellular vinyl resin. The printed areas, which had not expanded as much, were taken on the average to represent the height of expansion in the printed areas. The percentage restriction was defined as the height of the printed areas over the height of the fully expanded areas times 100. The amount of restriction ranged from about 6% for a very thin ink film containing the tin mercaptide to about 65% for a preferred ink film containing a mixture of $SnCl_2$ and tin malleate of the following formulation:

| Ingredients: | Parts by weight |
|---|---|
| Vinyl chloride-vinyl acetate copolymer, 14% by weight vinyl acetate | 35 |
| Cyclohexanone | 20 |
| Stannous chloride | 22.5 |
| Stannous malleate (Thermolite 32) | 22.5 |

I claim:
1. A chemically embossed surface covering comprising a sheet of fused and plasticized vinyl resin, the sheet having a plurality of cellular elevated regions separated by substantially non-cellular lower regions arranged in a predetermined pattern, the cellular elevated regions containing the decomposition products of an organic blowing agent, the substantially non-cellular lower regions containing said blowing agent in undecomposed form and a tin salt.

2. The method of chemically embossing a thermoplastic sheet which comprises blending
   (1) a vinyl resin,
   (2) a plasticizer for said resin,
   (3) a blowing agent which decomposes when heated at a temperature in the range above the glass transition temperature of the plasticized vinyl resin and below the decomposition temperature of said resin, and
   (4) an accelerator for reducing the decomposition temperature of said blowing agent,
forming said blend into a sheet, applying to said sheet in a predetermined pattern a liquid containing a deactivating agent for said accelerator comprising a tin salt, and heating the resulting sheet to a temperature in the range of about 300°–450° F. to fuse said plasticized resin and decompose only that blowing agent which has not been in contact with said deactivator.

3. The method according to claim 1 wherein said resin comprises poly(vinyl chloride).

4. The method according to claim 1 wherein said blowing agent comprises azodicarbonamide.

5. The method according to claim 1 wherein said accelerator comprises a compound selected from the group consisting of lead salts and zinc salts.

6. A method according to claim 1 wherein said deactivator comprises a tin chloride.

7. A method according to claim 1 wherein said deactivator comprises a mixture of an organic tin salt and an inorganic tin salt.

References Cited
UNITED STATES PATENTS 3,293,094 12/1966 Nairn et al. _____ 264—47 XR
3,293,108 12/1966 Nairn et al. _____ 264—47 XR ALEXANDER H. BRODMERKEL, *Primary Examiner.*

P. E. ANDERSON, *Assistant Examiner.*

UNITED STATES PATENT OFFICE
CERTIFICATE OF CORRECTION

Patent No. 3,373,072                                        March 12, 1968

James R. Jones

It is hereby certified that error appears in the above numbered patent requiring correction and that the said Letters Patent should read as corrected below.

Column 4, line 15, for "became" read -- become --; column 5, line 61, for "usrface" read -- surface --; column 8, lines 15, 17, 19, 22 and 24, for the claim reference numeral "1", each occurrence, read -- 2 --.

Signed and sealed this 8th day of April 1969.

(SEAL)
Attest:

Edward M. Fletcher, Jr.                                  EDWARD J. BRENNER
Attesting Officer                                              Commissioner of Patents